(12) United States Patent
Khaitan et al.

(10) Patent No.: US 11,704,562 B1
(45) Date of Patent: Jul. 18, 2023

(54) ARCHITECTURE FOR VIRTUAL INSTRUCTIONS

(71) Applicant: Meta Platforms, Inc., Menlo Park, CA (US)

(72) Inventors: Harshit Khaitan, San Jose, CA (US); Miguel Angel Guerrero, Palo Alto, CA (US); Liangzhen Lai, Fremont, CA (US); Simon James Hollis, Redmond, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 423 days.

(21) Appl. No.: 17/088,947

(22) Filed: Nov. 4, 2020

(51) Int. Cl.
*G06N 3/08* (2023.01)
*G06N 3/04* (2023.01)
*G06F 8/41* (2018.01)

(52) U.S. Cl.
CPC .............. *G06N 3/08* (2013.01); *G06F 8/433* (2013.01); *G06F 8/458* (2013.01); *G06N 3/04* (2013.01)

(58) Field of Classification Search
CPC ......... G06F 8/40–51; G06N 3/04; G06N 3/08
USPC .................................................. 717/136–161
See application file for complete search history.

(56) References Cited

U.S. PATENT DOCUMENTS

| | | |
|---|---|---|
| 9,710,265 B1 | 7/2017 | Temam |
| 9,836,691 B1 | 12/2017 | Narayanaswami |
| 10,175,980 B2 | 1/2019 | Temam |
| 10,496,326 B2 | 12/2019 | Temam |
| 10,534,607 B2 | 1/2020 | Temam |
| 10,802,956 B2 | 10/2020 | Temam |

(Continued)

OTHER PUBLICATIONS

Ambrosi, J., et al., Hardware-Software Co-Design for an Analog-Digital Accelerator for Machine Learning, 2018 IEEE International Conference on Rebooting Computing (ICRC), Nov. 2018, 13 pages, [retrieved on Feb. 23, 23], Retrieved from the Internet: <URL: http://ieeexplore.ieee.org/>.*

(Continued)

*Primary Examiner* — Geoffrey R St Leger
(74) *Attorney, Agent, or Firm* — Baker Botts L.L.P.

(57) ABSTRACT

A system including a machine learning accelerator (MLA) hardware configured to perform machine-learning operations according to native instructions; an interpreter computing module configured to: generate, based on virtual instructions, machine language instructions configured to be processed by a processing hardware implementing the interpreter computing module; and cause the processing hardware to perform machine-learning operations according to the machine language instructions; and a compiler computing module associated with the MLA hardware, the compiler computing module configured to: receive instructions for performing an inference using a machine-learning model; based on the received instructions: generate the native instructions configured to be processed by the MLA hardware, the native instructions specifying first machine-learning operations associated with performing the inference; and generate the virtual instructions configured to be processed by the interpreter computing module, the virtual instructions specifying second machine-learning operations associated with performing the inference.

20 Claims, 12 Drawing Sheets

(56) References Cited

U.S. PATENT DOCUMENTS

| | | | |
|---|---|---|---|
| 2008/0256330 A1* | 10/2008 | Wang | G06F 8/45 |
| | | | 712/E9.016 |
| 2016/0364276 A1* | 12/2016 | Wu | G06F 9/4552 |
| 2018/0349114 A1* | 12/2018 | Brown | G06N 20/00 |
| 2019/0205756 A1 | 7/2019 | Temam | |
| 2019/0286973 A1* | 9/2019 | Kowuri | G06N 3/04 |
| 2020/0005128 A1 | 1/2020 | Temam | |

OTHER PUBLICATIONS

Dettmers, Deep Learning in a Nutshell: Core Concepts, pp. 1-10, Nov 3, 2015.

Jiao, et al., ISSCC 2020/Session 7/High-Performance Machine Learning /7.2, 2020 IEEE, pp. 136-138, Feb. 18, 2020.

Emer, et al., DNN Accelerator Architectures, ISCA Tutorial, 70 pages, 2019.

* cited by examiner

ARCHITECTURE FOR VIRTUAL INSTRUCTIONS

TECHNICAL FIELD

This disclosure generally relates to accelerators for machine learning models.

BACKGROUND

Neural networks are increasingly being used to implement machine learning (ML) techniques to solve a wide variety of problems including, but not limited to, object identification, feature classification, or content-driven image processing. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Therefore, existing ML accelerators focus on using high compute parallelism along with an optimized data orchestration throughout the memory hierarchy to speed up the processing of convolutional layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

Innovative aspects of the subject matter described in this specification may be embodied in a system that includes a machine learning accelerator (MLA) hardware configured to perform machine-learning operations according to native instructions; an interpreter computing module configured to: generate, based on virtual instructions, machine language instructions configured to be processed by a processing hardware implementing the interpreter computing module; and cause the processing hardware to perform machine-learning operations according to the machine language instructions; and a compiler computing module associated with the MLA hardware, the compiler computing module configured to: receive instructions for performing an inference using a machine-learning model; based on the received instructions: generate the native instructions configured to be processed by the MLA hardware, the native instructions specifying first machine-learning operations associated with performing the inference; and generate the virtual instructions configured to be processed by the interpreter computing module, the virtual instructions specifying second machine-learning operations associated with performing the inference.

Other embodiments of these aspects include corresponding methods, apparatus, and computer programs, configured to perform the actions of the methods, encoded on computer storage devices.

These and other embodiments may each optionally include one or more of the following features. For instance, further comprising a local memory of the MLA hardware, wherein the first machine-learning operations comprise computations using weights associated with the machine-learning model and activations, wherein the native instructions specify memory locations of the activations and the weights within the local memory of the MLA hardware. The second machine-learning operations comprise data transfers between the local memory of the MLA hardware and a system memory of the processing hardware. The compiler computing module is further configured to: identify first dependencies of the first machine-learning operations of the native instructions, and encode the first dependencies within the native instructions; and identify second dependencies of the second machine-learning operations of the virtual instructions, and encode the second dependences within the virtual instructions; wherein the first machine-learning operations and the second machine-learning operations are synchronized based on the first dependencies and the second dependencies. The MLA hardware is further configured to: generate a synchronization token indicating a processing completion of one of the first machine-learning operations on which at least one of the second machine-learning operations depends; and transmit, to the interpreter computing module, the synchronization token. The interpreter computing module is configured to execute the at least one of the second machine-learning operations based on a determination that the synchronization token received from the MLA hardware satisfies one or more dependency criteria associated with the at least one of the second machine-learning operations. The interpreter computing module is further configured to: generate a synchronization token indicating a processing completion of one of the second machine-learning operations on which at least one of the first machine-learning operations depends; and transmit, to the MLA hardware, the synchronization token. The MLA hardware is configured to execute the at least one of the first machine-learning operations based on a determination that the synchronization token received from the interpreter computing module satisfies one or more dependency criteria associated with the at least one of the first machine-learning operations. The processing hardware is a central processing unit. The native instructions are generated according to a first instruction set architecture of the MLA, and the virtual instructions are generated according to a second instruction set architecture of the interpreter.

The details of one or more embodiments of the subject matter described in this specification are set forth in the accompanying drawings and the description below. Other potential features, aspects, and advantages of the subject matter will become apparent from the description, the drawings, and the claims.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

DESCRIPTION OF EXAMPLE EMBODIMENTS

The present disclosure relates to an architecture for implementing two streams of instructions for use with a machine-learning (ML) accelerator (MLA) used in a machine learning (ML) process. Specifically, the MLA may not be able to process certain types of operations—e.g., instructions that are not understood by the MLA. Such instructions can include instructions for performing bilinear interpolation and conditional execution instructions (e.g., if-then loops). A compiler can generate the two types of instructions—native instructions that are understood/processed by the MLA, and virtual instructions that are processed (emulated) by a CPU subsystem. The virtual instructions can include the instructions that are not processable by the MLA. The MLA can execute the native instructions, and an interpreter of the CPU subsystem can process the virtual instructions using hardware available on the host system. The native instructions and the virtual instructions can be synchronized by use of synchronization tokens (bidirectional synchronization).

By including virtual instructions, new operands that are not currently supported by the MLA can be supported by the emulator. This allows new operators to be defined within the system and used as new ML applications and use cases are employed. Additionally, by having separate streams of instructions (as opposed to a single stream of instructions that includes both native and virtual instructions), hardware complexity is reduced and processing power is reduced.

Before discussing the present embodiments in detail, it may be beneficial to first provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

Figure 1:
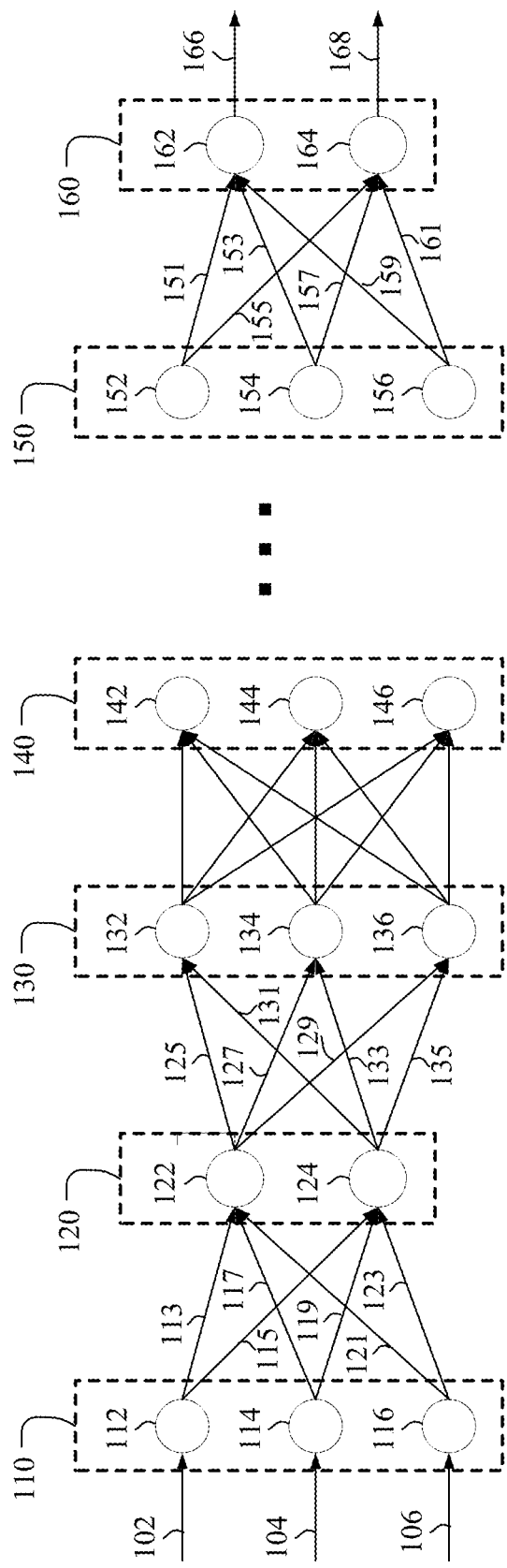
FIG. 1 illustrates selected elements of an example of a multilayer perception (MLP) neural network.

FIG. 1 illustrates selected elements of an example of a multilayer perception neural network, in accordance with particular embodiments. Its structure may include multiple hidden, e.g., internal, layers that map an input layer 110 that receives a set of inputs or a vector input to an output layer 160 that includes a set of outputs or a vector output. Each layer may include any given number of nodes, which are herein illustratively shown as circles within each layer. For example, input layer 110 includes three nodes, shown as nodes 112 114, and 116, and output layer 160 includes two nodes, shown as 162 and 164. The example neural network illustrated in FIG. 1 includes at least four hidden layers but may include additional hidden layers not shown in FIG. 1. In the illustrated example, the first hidden layer 120 includes two nodes, shown as nodes 122 and 124, while hidden layers 130, 140, and 150 each include three nodes, shown as nodes 132, 134, and 136, nodes 142, 144, and 146, and nodes 152, 154, and 156, respectively. Generally, the deeper the MLP (e.g., the greater the number of hidden layers in the MLP), the greater its capacity to learn. The input layer 110 receives a vector input, illustratively shown as a three-dimensional vector consisting of inputs 102, 104 and 106, and may apply the received vector input to the first hidden layer 120 in the sequence of hidden layers. The output layer 160 receives the output from the last hidden layer in the multilayer model, e.g., 150, processes its inputs, and produces a vector output result, illustratively shown as a two-dimensional vector consisting of outputs 166 and 168.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 110 may receive only one input and may be passive, meaning that each node may simply relay the value of its single input to its output(s) thus providing a copy of the input to the output(s).

In the example neural network illustrated in FIG. 1, the outputs of nodes 112, 114, and 116 of input layer 110 feed forward as inputs to hidden layer 120, which includes nodes 122 and 124. The outputs of nodes 122 and 124, in turn, feed forward as inputs to hidden layer 130, which includes nodes 132, 134, and 136, the outputs of nodes 132, 134, and 136 feed forward as inputs to hidden layer 140, which includes nodes 142, 144, and 146, and so on. Finally, the outputs of nodes 152, 154, and 156 of the final hidden layer 150 feed forward as inputs to output layer 160, which includes nodes 162 and 164. Interconnections, or links, between neurons, shown in FIG. 1 as arrows between various nodes, may have respective weights associated with them. For example, the interconnection between node 112 of input layer 110 and node 122 of hidden layer 120 may be associated with a weight 113. In addition, the interconnection between node 112 of input layer 110 and node 124 of hidden layer 120 may be associated with a weight 115, the interconnection between node 114 of input layer 110 and node 122 of hidden layer 120 may be associated with a weight 117, the interconnection between node 114 of input layer 110 and node 124 of hidden layer 120 may be associated with a weight 119, the interconnection between node 116 of input layer 110 and node 122 of hidden layer 120 may be associated with a weight 121, and the interconnection between node 116 of input layer 110 and node 124 of hidden layer 120 may be associated with a weight 123. Similarly, the interconnections between the nodes of hidden layers 120 and 130 may be associated with weights 125, 127, 129, 131, 133, and 135, respectively, and the interconnections between the nodes of hidden layers 150 and output layer 160 may be associated with weights 151, 153, 155, 157, 159, and 161, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
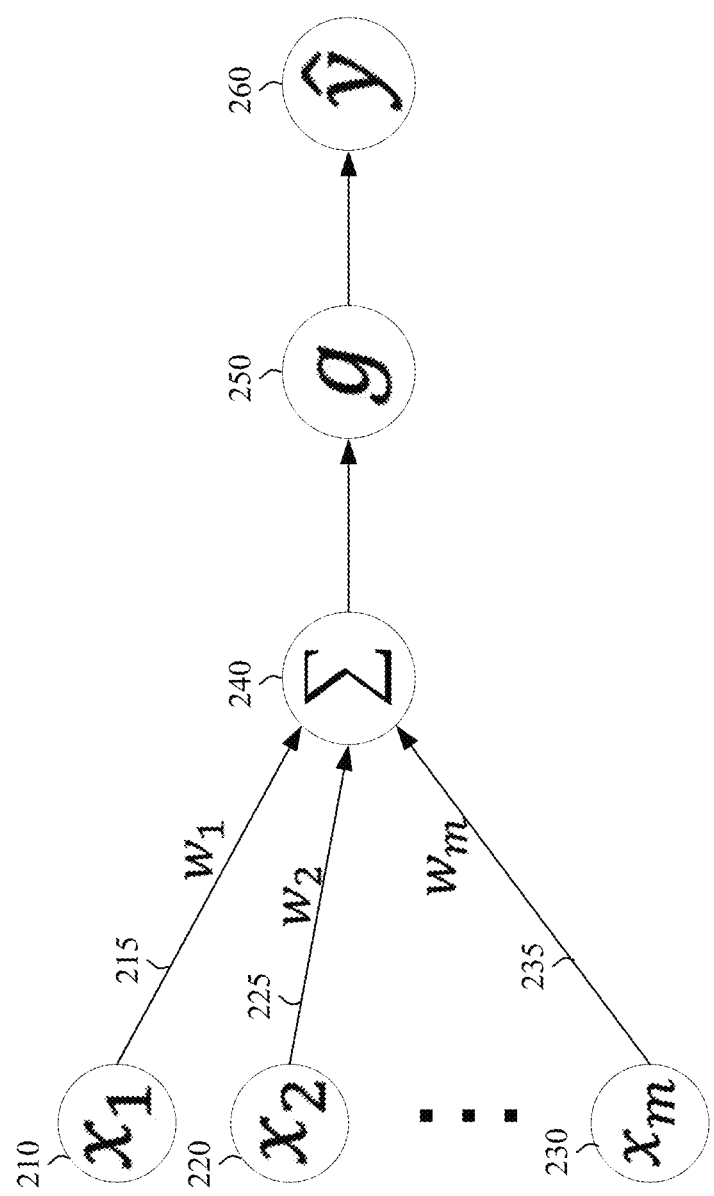
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector ŷ for a particular neural network node given inputs $x_1$ (210), $x_2$ (220), and $x_3$ (230), respective interconnection weights $w_1$ (215), $w_2$ (225), and $w_3$ (235), and a non-linear activation function g (250). In the illustrated example, the output vector 9 may be determined may applying the activation function g (250) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feed-forward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein. For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For examples, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3:
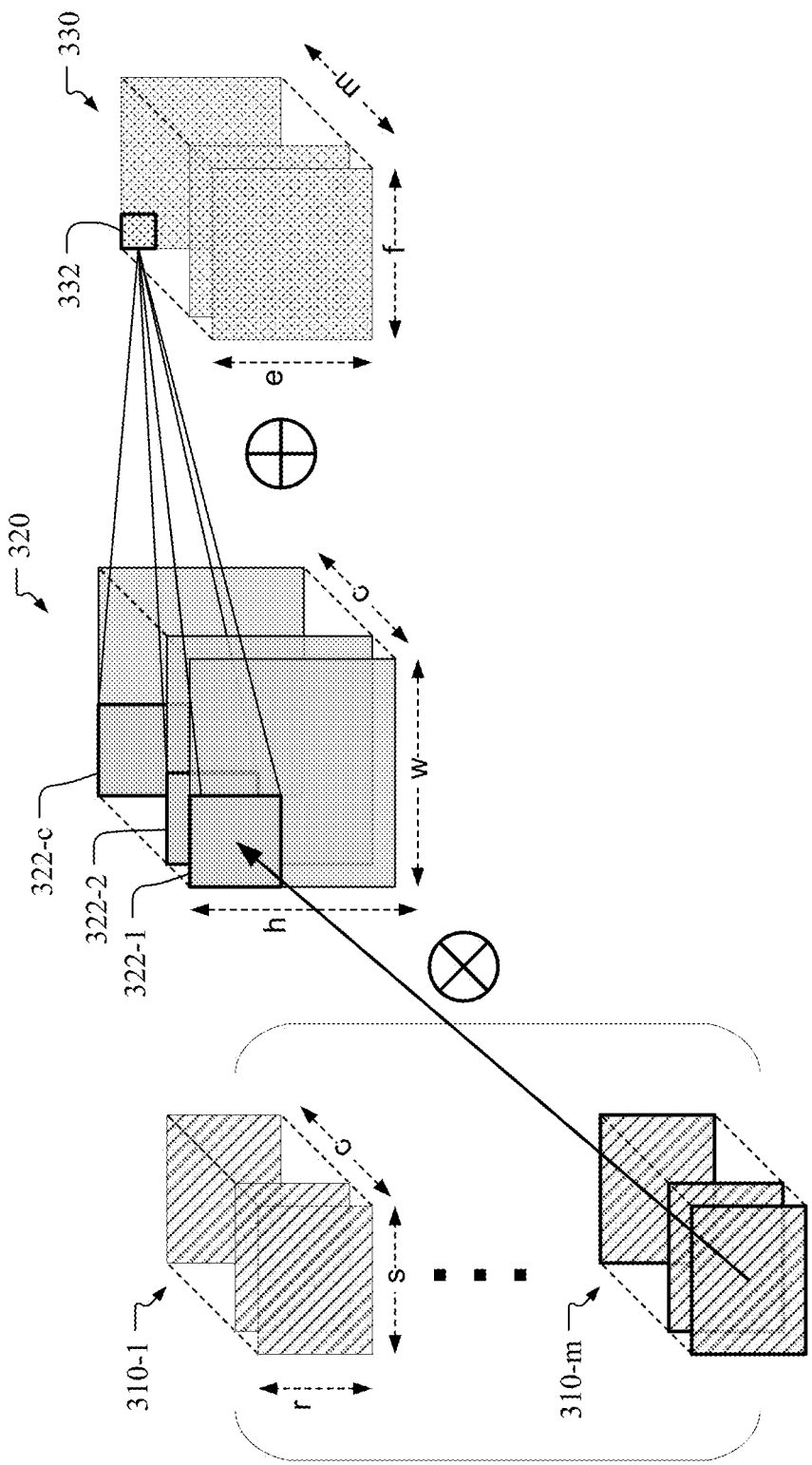
FIG. 3 illustrates selected elements of an example convolutional layer in a convolutional neural network (CNN).

FIG. 3 illustrates selected elements of an example convolutional layer in a convolutional neural network. In the illustrated example, a three-dimensional (3D) output feature map 330 is generated by performing a series of two-dimensional (2D) convolution operations over a 3D input feature map 320 using a collection of 2D convolution filters 310. More specifically, the input feature map 320 has dimensions h (height)×w (width)×c (where c represents the number of input channels) and the output feature map 330 has dimensions e×f×m (where m represents the number of output channels). In this example, multiple filters 310 are to be applied to the input feature map to generate each element, of each channel, of the output feature map. More specifically, a respective different filter 310 is applied to produce the elements of the output feature map for each given output channel. Therefore, the number of filters 310 (i.e., m) matches the number of output channels (m).

As shown in FIG. 3, each 3D filter 310 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 320. More specifically, each 2D kernel of filter 310-$m$ is applied in a convolution operation over the elements in a respective channel of input feature map 320. For example, a first 2D kernel of filter 310-$m$ provides the weights that are multiplied by respective values of the elements in an r×s sized portion 322-1 of the elements of a first channel of input feature map 320, a second 2D kernel of filter 310-$m$ provides the weights that are multiplied by respective values of the elements in an r×s sized portion 322-2 of the elements of a second channel of input feature map 320, and so on, such that a final 2D kernel of filter 310-$m$ provides the weights that are multiplied by respective values of the elements in an r×s sized portion 322-$c$ of the elements of the last channel of input feature map 320. The results of these multiplication operations are then combined to generate a single element 332 of a single channel of output feature map 330, as shown in FIG. 3. This process is repeated as the 2D kernels of filter 310-$m$ are applied to other portions of input feature map 320 to produce the remaining elements of output feature map 330 in the same output channel as element 332, and as the 2D kernels of respective other ones of the filters 310 are applied to input feature map 320 to produce the elements of output feature map 330 in each of the remaining output channels.

Figure 4:
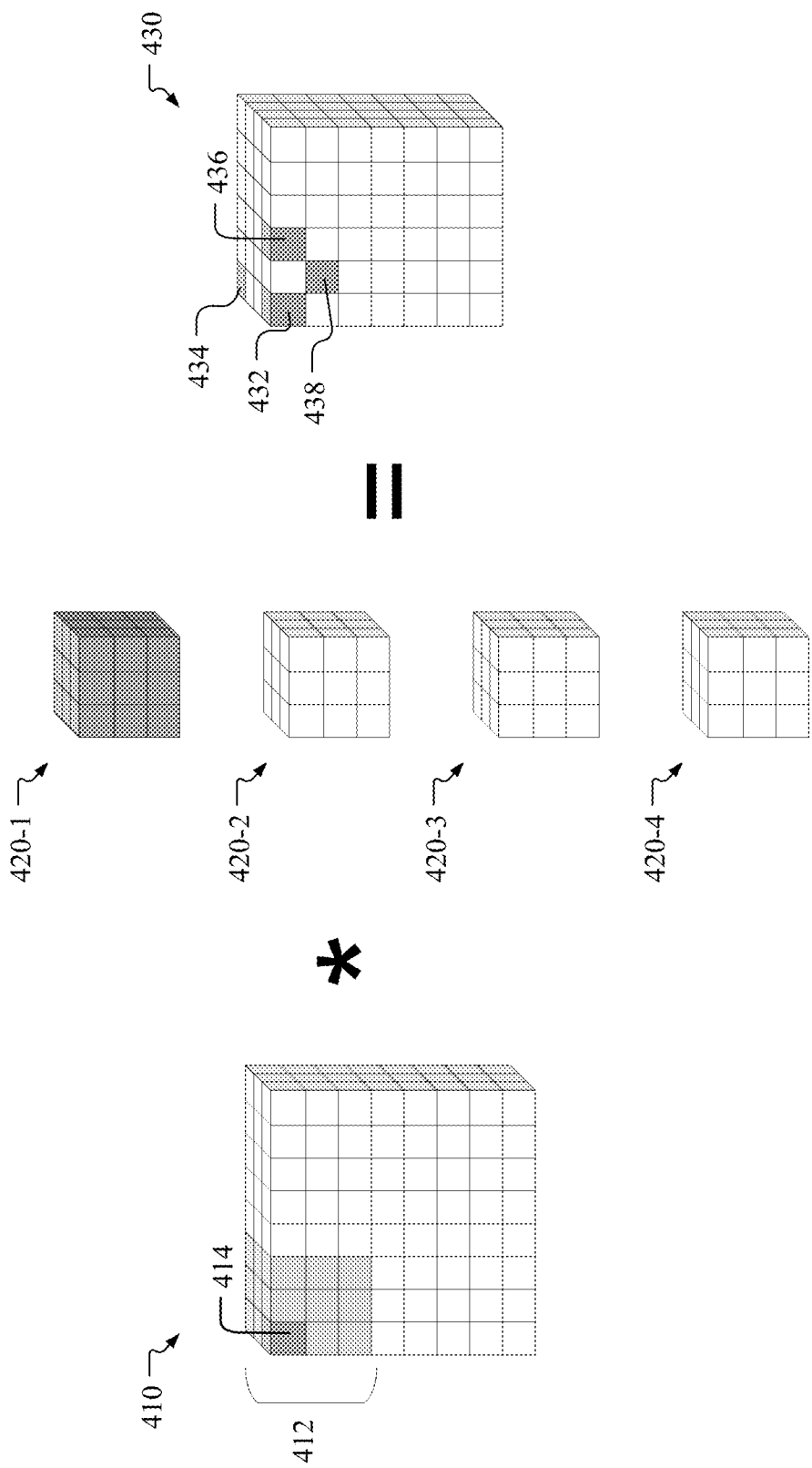
FIG. 4 illustrates an example multi-level convolution operation.

FIG. 4 illustrates an example multi-channel convolution operation, in accordance with particular embodiments. In this example, a multi-channel (3D) output feature map 430 is generated by the application of multiple 3D filters 420 to successive portions of a multi-channel (3D) input feature map 410. In this example, the dimensions of input feature map 430 are X×Y×Zin, where Zin represents the number of input channels, and the dimensions of output feature map 430 are Xout×Yout×Zout, where Zout represents the number of output channels. Each 3D filter 420 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 430 is computed as follows:

$$[x][y][zout] \mathrel{+}= activations[x+kx][y+ky][zin] * weights[kx][ky][zin][zout]$$

In the illustrated example, there is one 3D filter 420 for each channel (zout) in Zout. More specifically, the illustrated multi-channel convolution uses four 3D filters 420 to generate elements for each x/y position in each of four output channels, respectively, while sweeping the appropriate 2D kernels across and down the elements of input feature map 410 in each of the input channels. For example, the value of element 432 of output feature map 430 is determined by applying highlighted 3D filter 420-1 to the highlighted portion 412 of input feature map 410, i.e., 36 activations including 9 activations in respective x/y positions in each of 4 input channels zin. Similarly, the value of element 434 of output feature map 430 is determined by applying 3D filter 420-4 to the highlighted portion 412 of input feature map 410.

Traversing input feature map 410 in the x dimension involves sweeping the highlighted portion 412 across the input feature map such that element 414 moves one position to the right to identify a next set of activations for each successive iteration in the x dimension. For example, the value of element 436 of output feature map 430 is determined by applying 3D filter 420-1 to the highlighted portion 412 of input feature map 410 after the highlighted portion has been moved from the initial position in which it is shown in FIG. 4 to a location two positions to the right. Traversing input feature map 410 in the y dimension involves sweeping the highlighted portion 412 across the input feature map such that element 414 moves one position down to identify a next set of activations for each successive iteration in the y dimension. For example, the value of element 438 of output feature map 430 is determined by applying 3D filter 420-1 to the highlighted portion 412 of input feature map 410 after the highlighted portion has been moved from the initial position in which it is shown in FIG. 4 to a location one position down and one position to the right.

Performing the multi-channel convolution illustrated in FIG. 4 involves performing a series of 2D convolutions, as follows:

```
for zout in Zout
  for x in Xout
    for y in Yout
      for kx in KernelX
        for ky in KernelY
          for zin in Zin
            output[x][y][zout]+=activations [x+kx][y+ky][zin]*weights [kx][ky][zin][zout]
```

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), weight tensors (weight addresses), and output tensor (output address) may be performed in hardware, such as within the ML accelerators described herein, in accordance with the following:

for the activation addresses:
```
for x in Xout
  for y in Yout
    for kx in KernelX
      for ky in KernelY
        for zin in Zin
          activations [x+kx] [y+ky] [zin],
```
for the weight addresses:
```
for zout in Zout
  for kx in KernelX
    for ky in Kernel Y
      for zin in Zin
        weights[kx][ky][zin][zout],
```
and for the output address:
```
for zout in Zout
  for x in Xout
    for y in Yout
      for zin in Zin
        outputs[x][y][zout].
```

Figure 5A:
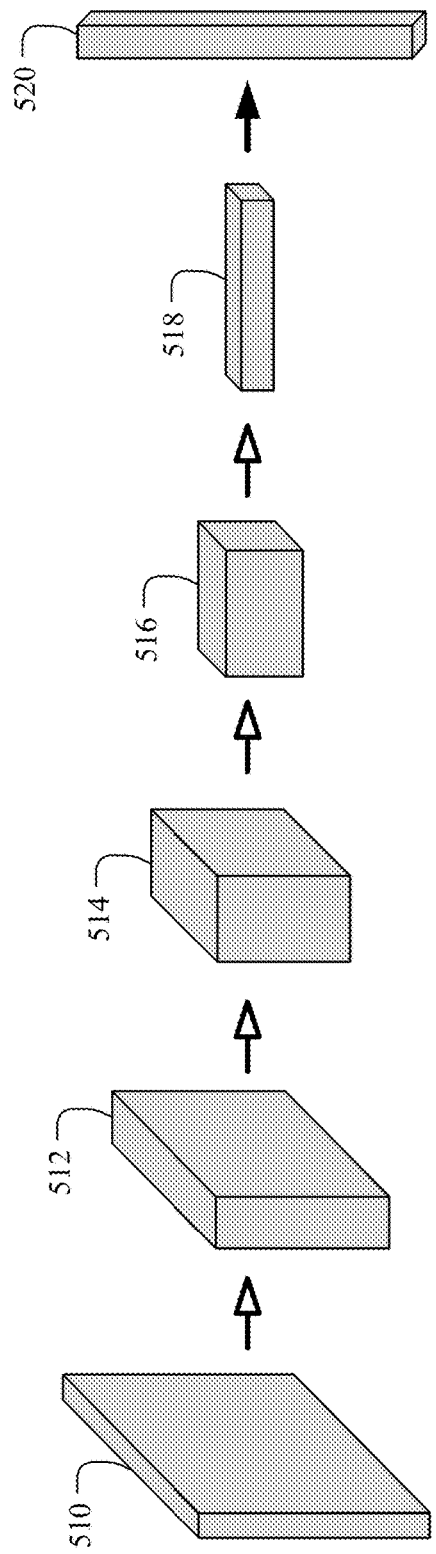
FIG. 5A illustrates an example CNN for a classification-type network.

FIG. 5A illustrates an example convolutional neural network in which an output feature map 520 is generated based on an input feature map 510 in a classification-type neural network. This type of neural network may typically involve a small or medium resolution input, a single vector output, and a relatively large number of output channels. In the illustrated example, intermediate feature maps of different sizes and shapes, shown as feature maps 512, 514, 516 and 518, are generated by performing successive convolution operations on each such intermediate feature map, in turn, and the output feature map 520 is generated by a fully connected (FC) layer operating on the final intermediate feature map 518. As shown in FIG. 5A, it may be typical for the overall size, and corresponding memory requirements, to be reduced for each successive intermediate feature map in a classification-type neural network.

Figure 5B:
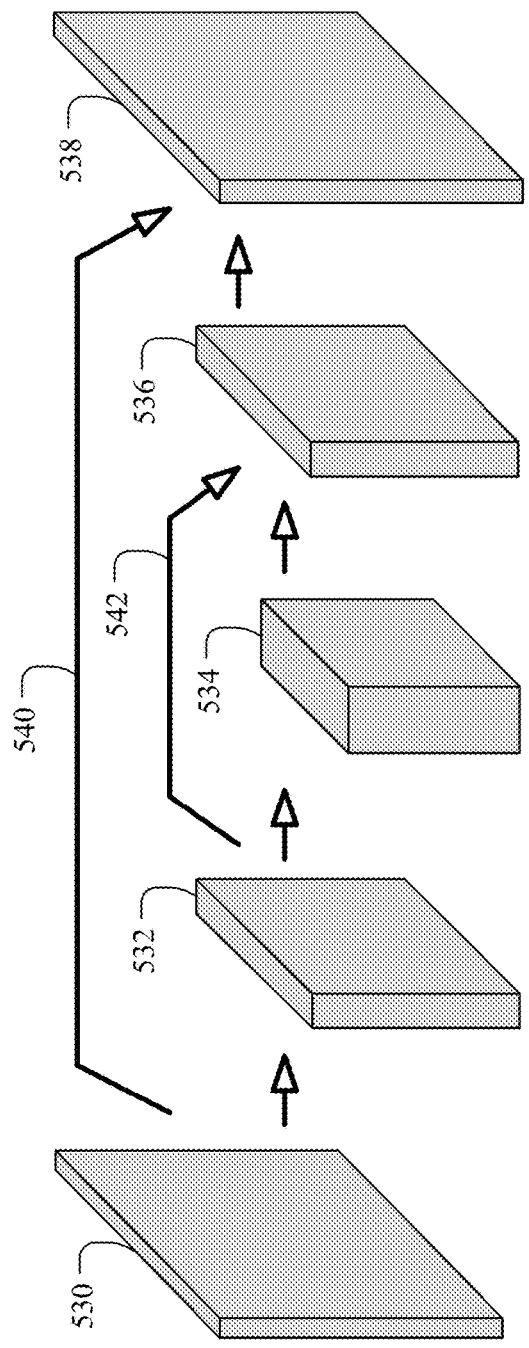
FIG. 5B illustrates an example CNN for a UNet-type network.

FIG. 5B illustrates an example CNN in which an output feature map 538 is generated based on an input feature map 530 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 540 and 542 in FIG. 5B. In the illustrated example, intermediate feature maps of different sizes and shapes, shown as feature maps 532, 534, and 536, are generated using a series of convolution operations prior to the generation of the output feature map 538. In this example, intermediate feature map 532 is generated based on input feature map 530, intermediate feature map 534 is generated based on intermediate feature map 532, intermediate feature map 536 is generated based on both intermediate feature map 534 and on intermediate feature map 532, and output feature map 538 is generated based on both intermediate feature map 536 and input feature map 530. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processors within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

The ML accelerators described herein employ a multi-level control architecture designed to optimally exploit parallelism provided by tensor processors in the ML accelerator. These machine learning accelerators may include one or more tensor processor clusters, each of which may include multiple tensor processors. Each tensor processor may be a single-instruction-multiple-data (SIMD) machine that includes a compute array capable of performing vector operations to implement data parallelism or model parallelism at the tensor processor or tensor processor cluster level. Each tensor processor cluster may include a shared controller that controls and synchronizes the operations of the tensor processors within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets.

Figure 6:
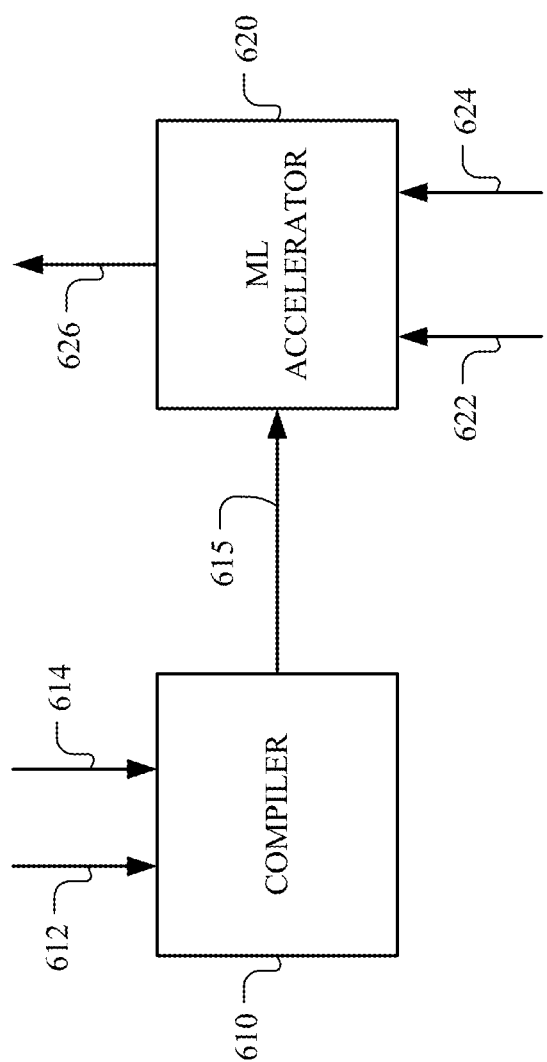
FIG. 6 illustrates selected elements of an example system including a compiler and an ML accelerator.

FIG. 6 illustrates selected elements of an example system including a compiler 610 and an ML accelerator 620. In the illustrated example, compiler 610 generates machine language instructions, shown as tensor instructions 615, based on inputs including programming language instructions 612 and configuration information 614 indicating the configuration of a neural network that is to perform the tensor instructions 615. In this example system, ML accelerator 620 receives the tensor instructions 615 and generates, for input features 622 and applicable weights 624, output features 626. For example, compiler 610 may, in accordance with an instruction set architecture (ISA) that is used to facilitate machine learning processing for a specific hardware architecture, map a single ML operation (such as a convolution operation) to multiple machine language instructions, any or all of which may be multi-dimensional (tensor) instructions. In particular embodiments, a full ML layer may be represented using one or more instructions in each of three classes of hardware instructions: compute instructions, non-linear (NLU) instructions, and direct memory access (DMA) instructions.

In particular embodiments, the compiler 610 may analyze a workload to be performed by the neural network and determine respective coarse-grained tensor instructions to be sent to each tensor processor cluster of ML accelerator 620 using a SIMD and/or single-program-multiple-data (SPMD) approach to distribute the workload. The compiler 610 may distribute the workload based on the architecture of the neural network, the number of tensor processor clusters, the number and processing capacity of the tensor processors in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processors, reduce the amount of data movement required between and within tensor processor clusters, and optimize resource utilization in ML accelerator 620.

Figure 7A:
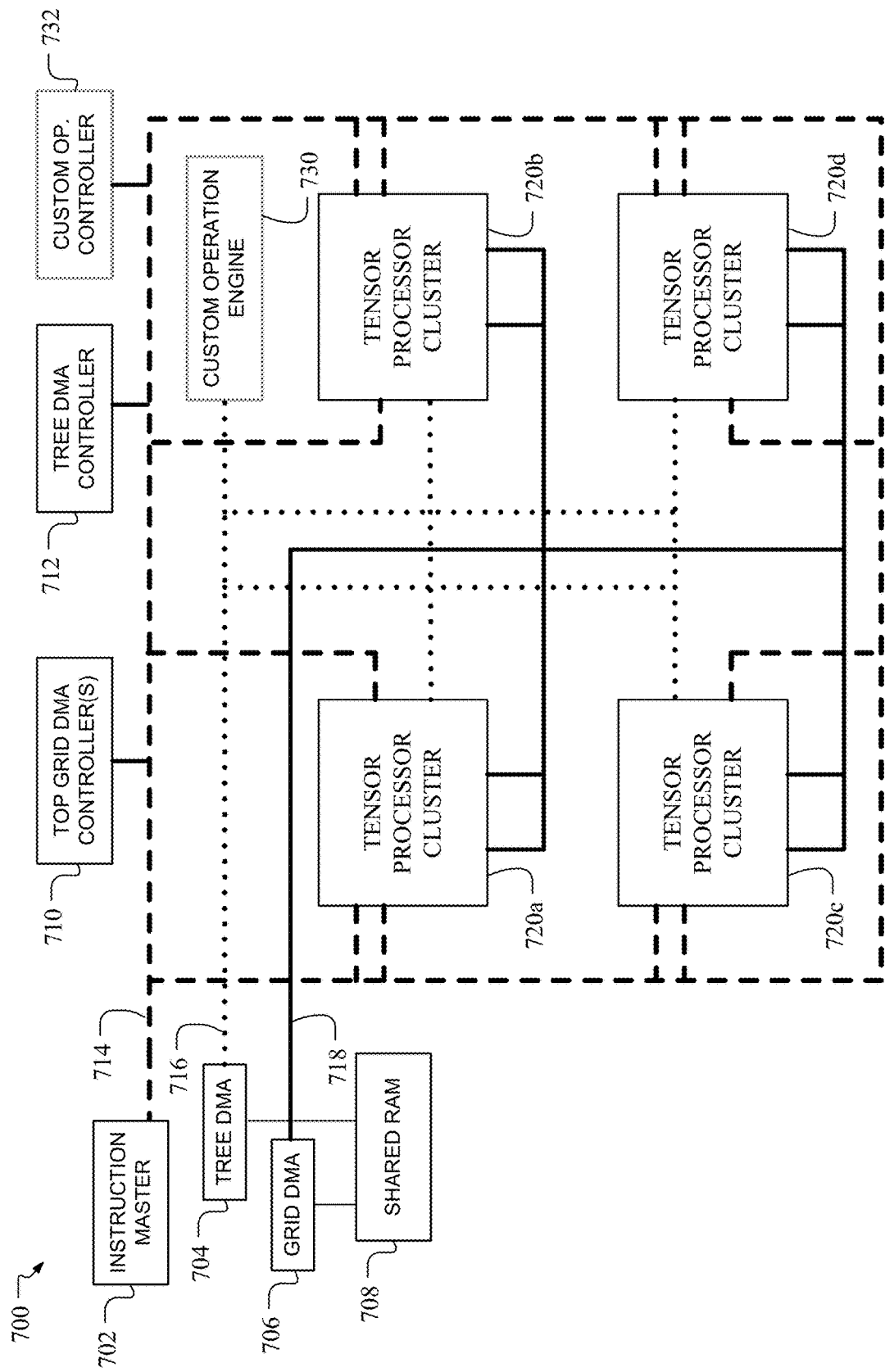
FIG. 7A illustrates selected elements of an example ML accelerator including multiple tensor processor clusters.
Figure 7B:
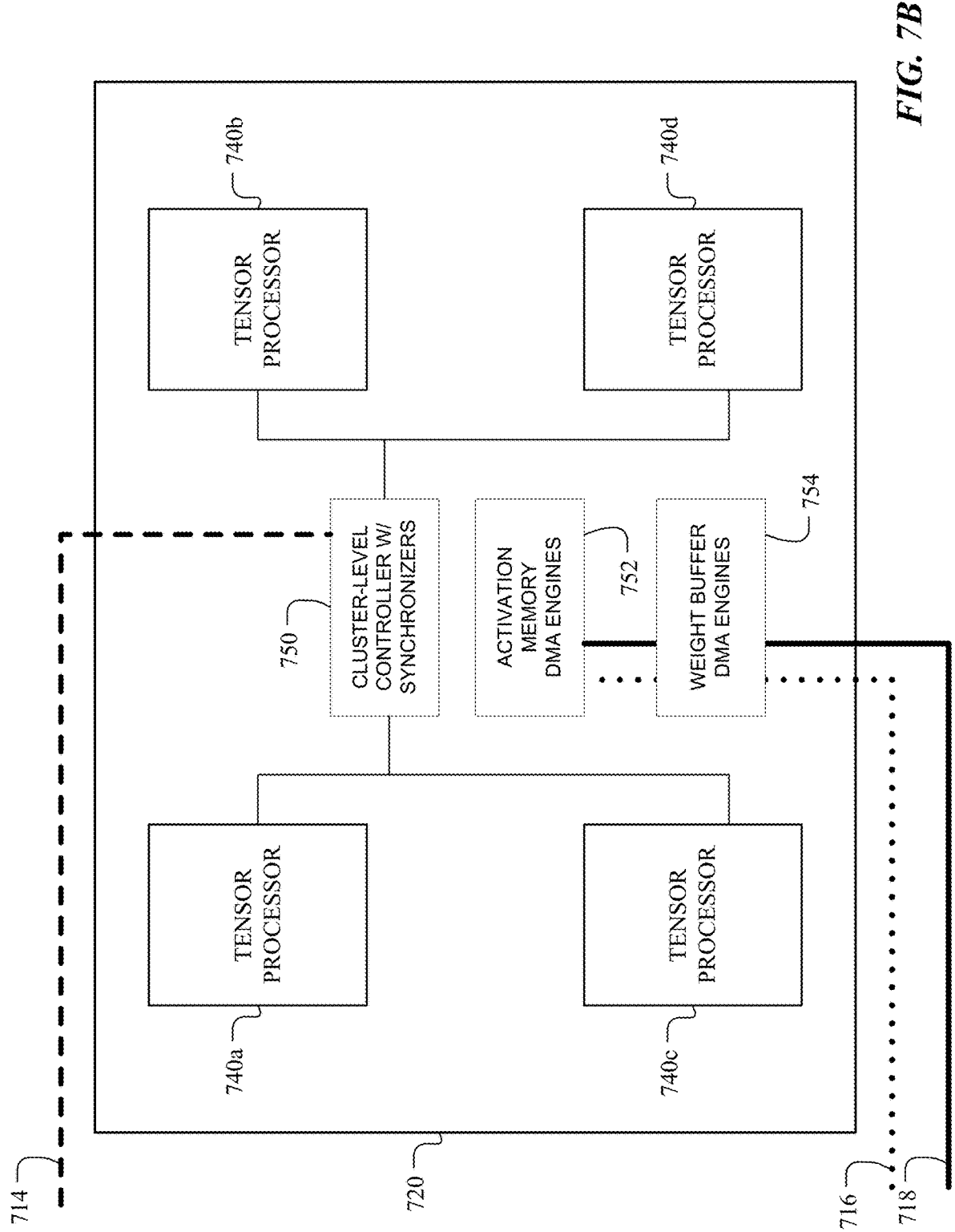
FIG. 7B illustrates selected elements of an example tensor processor cluster.
Figure 7C:
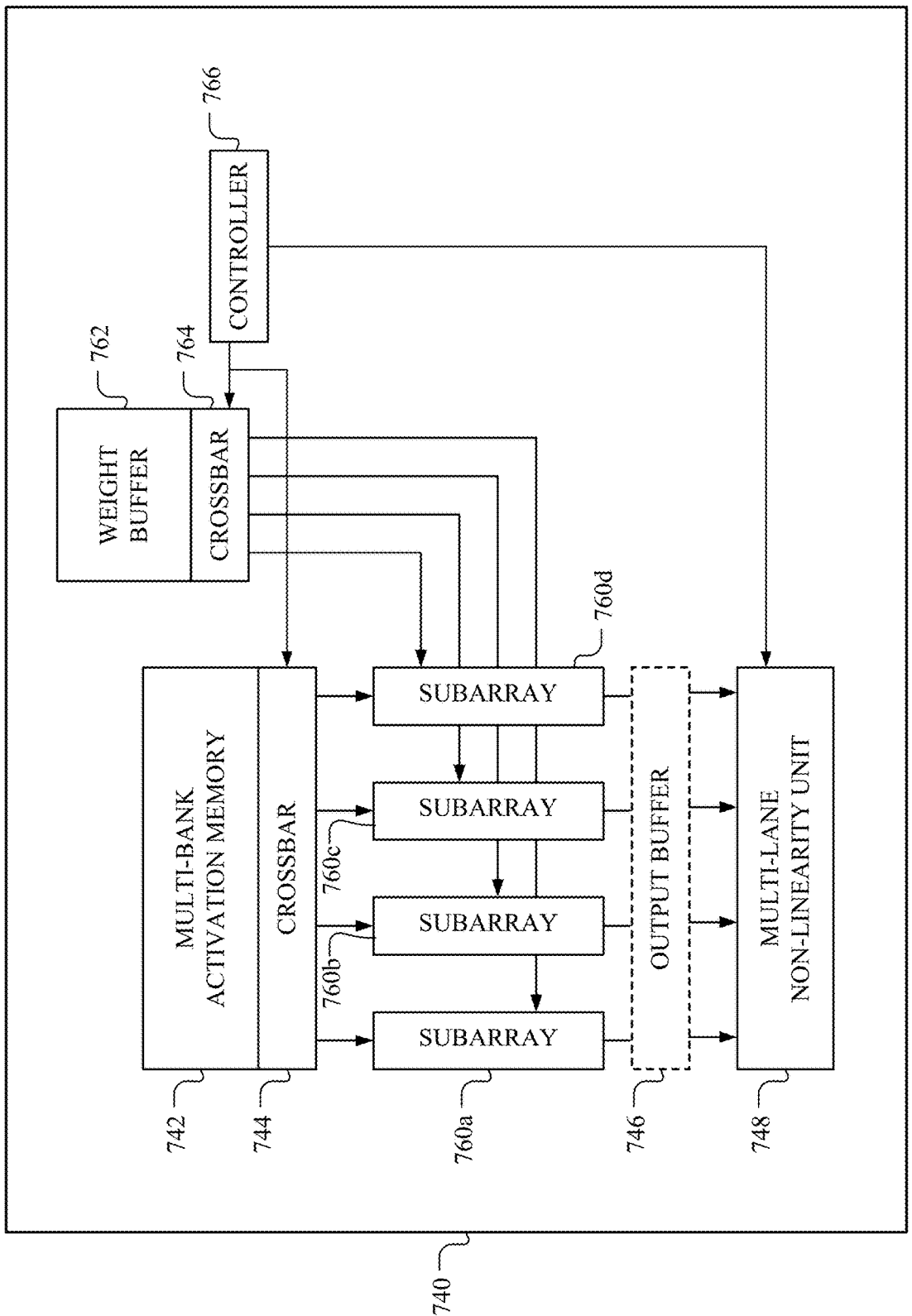
FIG. 7C illustrates selected elements of an example tensor processor.

FIGS. 7A through 7C illustrate selected elements of an example ML accelerator, such as an ML accelerator similar to ML accelerator 620 illustrated in FIG. 6, at different levels of the multi-level accelerator architecture. For example, FIG. 7A illustrates that an example ML accelerator 700 may include four tensor processor clusters 720 and may include, or be communicably coupled to, one or more top grid DMA controllers 710, a tree DMA controller 712, and/or an optional custom operation engine 730 and a corresponding optional custom operation controller 732. ML accelerator 700 may include, or be communicably coupled to, an instruction master 702, which may be communicably coupled to each of the four tensor processor clusters 720, the top grid DMA controllers 710, and the tree DMA controller 712 over an instruction bus 714. ML accelerator 700 may also include a tree DMA 704 and a grid DMA 706, each of which is communicably coupled to a shared RAM 708. Tree DMA 704 may be communicably coupled to each of the four tensor processor clusters 720 and the optional custom operation engine 730 over tree DMA bus 716. Grid DMA 706 may be communicably coupled to each of the four tensor processor clusters 720 over grid DMA bus 718. In at least some embodiments, ML accelerator 700 may also include a synchronization bus communicably coupled to the four tensor processor clusters 720, the top grid DMA controllers 710, the tree DMA controller 712, the optional custom operation engine 730 and corresponding optional custom operation controller 732, the instruction master 702, the tree DMA 704, the grid DMA 706, and/or the shared RAM 708, or any suitable subset thereof (not shown in FIG. 7A).

To support multiple tensor processor clusters processing input features in parallel, tree DMA controller 712 may distribute neural network weights (e.g., in packets) to tensor processor clusters 720 via tree DMA bus 716. The network topology in which the tree DMA controller 712 is communicatively coupled to each of the tensor processor clusters 720 may allow each tensor processor within a tensor processor cluster 720 to be communicatively coupled to the tree DMA controller 712 via a respective sub-branch of the tree DMA bus 716. Similarly, one or more top grid DMA controllers 710 may distribute activations to tensor processor clusters 720 via grid DMA bus 718. The network topology in which the grid DMA controller 710 is communicatively coupled to each of the tensor processor clusters 720 may allow each tensor processor within a tensor processor cluster 720 to be communicatively coupled to the grid DMA controller 710 via a respective sub-branch of the grid DMA bus 718. By structuring the tree DMA bus 716 and the grid DMA bus 718 according to a tree network topology (e.g., rather than a star or ring topology), the corresponding DMA controllers 712 and 710 may distribute neural network weights and activations to each tensor processor cluster 720 directly, thereby minimizing latency and overall power consumption. As such, the machine learning accelerator 700 may be suitable for AR/VR applications or other applications that require feature processing with minimal latency within a finite power budget.

FIG. 7B illustrates selected elements of an example tensor processor cluster 720, such as one of the four tensor processor clusters 720 of ML accelerator 700 illustrated in FIG. 7A. In this example, tensor processor cluster 720 includes four tensor processors 740, a shared cluster-level controller 750, one or more activation memory DMA engines 752, and one or more weight buffer DMA engines 754. An example tensor processor 740 is illustrated in FIG. 7C and described below. The shared cluster-level controller 750 may interpret each coarse-grained tensor instruction received from a compiler, such as compiler 610 illustrated in FIG. 6, and translate it into a series of fine-grained tensor instructions that are multicast to the tensor processors in the tensor processor cluster tasked with performing the common series of operations. Each of these fine-grained tensor instructions may, for example, represent a vector read operation, a vector write operation, a vector addition operation, or a vector multiplication operation to be performed by hardware compute arrays within each tensor processor or may represent a non-linear instruction to be applied to an intermediate output of the hardware compute arrays to produce an element of an output feature set. The shared cluster-level controller 750 may include synchronizers that synchronize the operations of the tensor processors within the cluster so that they perform the common series of operations in parallel and in lockstep. The shared cluster-level controller 750 may ensure that the appropriate subsets of the input feature set and the weights to be applied for that operation have been loaded into the local memories for each tensor processor. This may include generating an address pattern for the weights, generating an address pattern for the input activations, and generating an address pattern for the outputs of the common series of operations.

The cluster-level controller 750 receives tensor instructions, e.g., coarse-grained tensor instructions, over instruction bus 714. Each coarse-grained tensor instruction sent to a tensor processor cluster 620 may encode information usable by the cluster to perform a multi-cycle operation corresponding to a part of a single neural network layer. In one example, using a SPMD approach, the compiler 610 may distribute the workload such that different tasks are assigned to different tensor processor clusters 620 with some or all of the tensor processor clusters 620 operating on the same input feature set. Using this approach, the tensor processor clusters 620 may operate in parallel but may typically not operate in lockstep with each other. In another example, using a SIMD approach, the compiler 610 may distribute the workload such that the same tasks are assigned to multiple tensor processor clusters 620 and such that each of those multiple tensor processor clusters 620 operates on different data, such as on a different subset of an input feature set for the neural network. Using this approach, the tensor processor clusters 620 may operate in parallel and may typically, but not necessarily, operate in lockstep with each other. By contrast, within a tensor processor cluster 620, the operations of the tensor processors 740 of the cluster may always be performed in parallel and in lockstep.

In particular embodiments, the activation memory DMA engines 752 and weight buffer DMA engines 754 are communicably coupled to a grid DMA and a tree DMA, such as those illustrated in FIG. 7A, over grid DMA bus 718 and tree DMA bus 716, respectively, to provide the appropriate weights and input features to each tensor processor 740 in each cycle.

Convolutional neural networks used in AR/VR applications must typically support input and output feature maps with a wide variety of shapes and sizes, especially along the channel dimension. With existing ASIC accelerators, supporting this diversity can result in decreased hardware utilization and a corresponding loss of performance and energy efficiency. The tensor processors described in this application addresses this problem using flexible hardware resources and flexible computation-to-hardware mapping. For example, FIG. 7C illustrates selected elements of an example tensor processor 740, such as one of the four tensor processors 740 of tensor processor cluster 720 illustrated in FIG. 7B. In particular embodiments, tensor processor 740 is implemented with a flexible architecture in which computation components are organized such that the tensor processor can support a variety of convolutional layer shapes with high resource utilization and high reuse of locally available data. The tensor processor 740 may be a single-instruction-multiple-data (SIMD) machine that includes a compute array capable of performing vector operations that collectively implement higher-level tensor instructions using data parallelism or model parallelism in a neural network. In this example, tensor processor 740 includes a multi-bank activation memory 742, a first crossbar 744, four compute subarrays 760, an optional output buffer 746, a multi-lane non-linearity unit 748, a weight buffer 762, e.g., a register file storing weights, a second crossbar 764, and a local controller 766. In particular embodiments, tensor processor 740 may, during operation, be dynamically configured to perform convolution operations of different sizes and shapes by controlling the size and shape of the input feature map data and weights supplied to each of the subarrays 760 and MAC computation units thereof using the flexible crossbars 744 and 764 and by controlling the reduction and/or combination of the outputs of the each of the subarrays 760 and MAC computation units thereof to generate an output feature map of a desired size and shape. In particular embodiments, tensor processor 740 may also be configured to perform group convolution operations in which not all output elements depend on the same input elements or weights.

In the illustrated example, multi-bank activation memory 742 includes local memory elements that store the input feature map elements to be provided to various ones of the subarrays 760. The first crossbar 744 is a first flexible many-to-many crossbar that reads input feature map elements (e.g., pixel values) from multi-bank activation memory 742 and provides them to the appropriate subarrays 760 in each cycle. In the illustrated example, weight buffer 762, which may be implemented as a register file, includes local memory elements that store the filter weights to be provided to various ones of the subarrays 760. The second crossbar 764 is another flexible crossbar that loads filter weights from weight buffer 762 and provides them to the appropriate subarrays 760 in each cycle.

In particular embodiments, each of the four compute subarrays 760 includes an array of multiply-and-accumulate (MAC) computation units of a given size that operate in parallel to apply the weights defined for a given 2D kernel of a given 3D convolution filter to portions of an input feature map and produce portions of an output feature map. The output feature map may have a different shape than the input feature map. A local controller 766 within tensor processor 740 may, e.g., in conjunction with a shared cluster-level controller, such as shared cluster-level controller 750 illustrated in FIG. 7B, control the operation of the crossbars 744 and 764 and the flexible reduction module or multi-lane non-linearity unit 748, in accordance with the coarse-grained tensor instructions received from compiler 610 illustrated in FIG. 6 and/or fine-grained instructions received from the shared cluster-level controller 750.

In particular embodiments, the optional output buffer 746 stores intermediate outputs from one or more subarrays 760 such that partial results may be accumulated prior to passing them through a reduction module, thus reducing the scope and/or complexity of the reduction operation. In particular embodiment, the multi-lane non-linearity unit 748 is a flexible reduction module configurable to take an intermediate computation output from the subarrays 760 and perform a reduction (i.e., addition) of subarray outputs to produce an output for tensor processor 740 as a whole, where appropriate.

Figure 8:
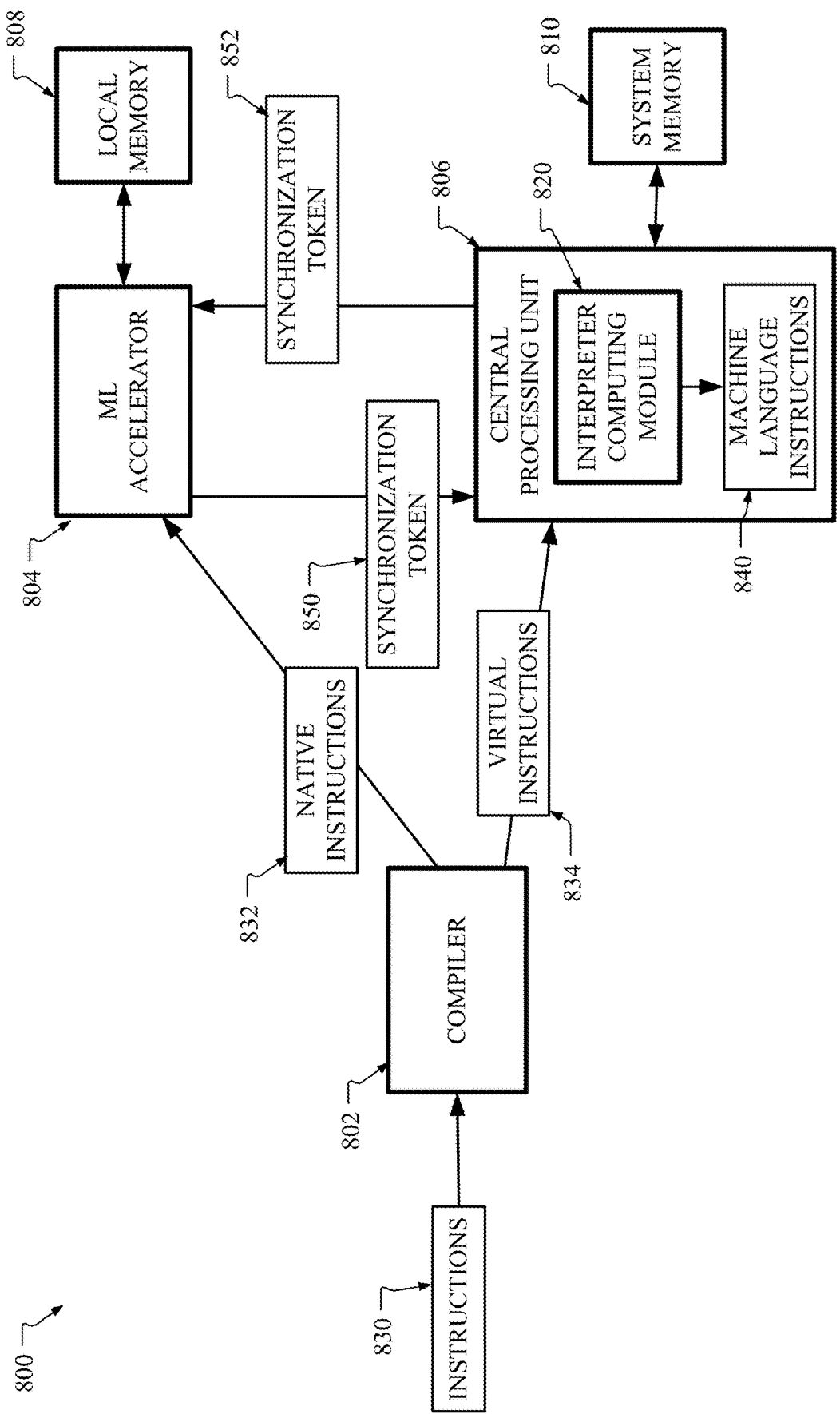
FIG. 8 illustrates an example computing architecture for generating native and virtual instructions streams.

FIG. 8 illustrates a computing environment 800. The computing environment 800 can include a compiler computing module 802, a machine learning (ML) accelerator (MLA) 804, a central processing unit (CPU) 806, a local memory 808, and a system memory 810. The compiler 802 can be in communication with the MLA 804; and the CPU 806. The MLA 804 can be in communication with the CPU 806 and the local memory 808. In some examples, the MLA 804 includes the local memory 808. The CPU 806 can be in communication with the MLA 804 and the system memory 810.

The CPU 806 can include an interpreter computing module 820.

The compiler computing module 802 can be similar to, or the same as, the compiler 610 of FIG. 6; and the MLA 804 can be similar to, or the same as, the ML accelerator 620 of FIG. 6.

In short, the MLA 804 may not support certain operations used when implementing the machine learning model, or performing a n-dimensional convolution machine learning operation. For example, the MLA 804 may be unable to support such operations as performing bilinear interpolation, conditional if-then operations, etc. To that end, the compiler computing module 802 can generate two separate instruction sets (or streams) that are synchronized at a low level—a native instruction set that is executed by the MLA 804, and a virtual instruction set that is emulated by the interpreter computing module 820, described further herein. The virtual instruction set can be extensible allowing for new operators to be defined at a later time, as machine learning operations and uses cases evolve.

To that end, the compiler computing module 802 receives instructions 830 to perform an inference using a machine-learning model (similar to that as described above). For example, the instructions 830 are associated with performing a n-dimensional convolution machine learning operation. The compiler computing module 802, in response to receiving the instructions 830, can generate native instructions 832 that are configured to be processed by the MLA 804. The native instructions 832 can specify first machine-learning operations associated with performing the inference (e.g., the n-dimensional convolution machine learning operation).

In some examples, the first machine-learning operations include computations using weights associated with the machine-learning model. In some examples, the first machine-learning operations include activations associated with the machine-learning model. In some examples, the native instructions 832 specify memory locations of the activations and the weights within the local memory 808.

In some examples, the compiler computing module 802 generates the native instructions 832 according to an instruction set architecture (ISA) of the MLA 804.

The compiler computing module 802 can provide the native instructions 832 to the MLA 804.

Furthermore, the compiler computing module 802, in response to receiving the instructions 830, can generate virtual instructions 834 that are configured to be processed by the interpreter computing module 820. The virtual instructions 834 can specify second machine-learning operations associated with performing the inference (e.g., the n-dimensional convolution machine learning operation).

In short, a subset of the instructions 830 can include instructions that are not able to be processed by the MLA 804—for example, certain types of operations that are not understood by the MLA 804. In some examples, such instructions that are not able to be processed by the MLA 804 can include instructions for performing bilinear interpolation and conditional execution instructions (e.g., if-then loops). As a result, the compiler computing module 802 can identify the subset of the instructions 830 that are not able to be processed by the MLA 804, and in response, generate the virtual instructions 834 that incorporate (based on) such subset of instructions that are not able to be processed by the MLA 804.

In some examples, the second machine-learning operations include data transfers between the local memory 808 of the MLA 804 and the system memory 810 of the CPU 806. For example, the data transfers can include data transfers of activations and weights associated with the machine-learning model (e.g., the n-dimensional convolution machine learning operation).

In some examples, the compiler computing module 802 generates the virtual instructions 834 according to an instruction set architecture (ISA) of the interpreter computing module 820.

The compiler computing module 802 can provide the virtual instructions to the interpreter computing module 820.

In some examples, the compiler computing module 802 can identify dependencies between machine-learning operations of the native instructions 832. For example, a first machine-learning operation of the native instructions 832 can be dependent upon a second machine-learning operation of the native instructions 832. That is, completion of the second machine-learning operation of the native instructions 832 is needed prior to processing of the first machine-learning operation of the native instructions 832 can commence. For example, a first machine-learning operation of the native instructions 832 can be dependent upon a second machine-learning operation of the virtual instructions 834. That is, completion of the second machine-learning operation of the virtual instructions 834 is needed prior to processing of the first machine-learning operation of the native instructions 832 can commence. The compiler computing module 802 can then, after identifying the dependencies between the machine-learning operations of the native instructions 832, encode the dependencies within the native instructions 832. For example, the compiler computing module 802 can encode the dependencies within the native instructions 832 using identifiers (IDs) as references.

In some examples, the compiler computing module 802 can identify dependencies between machine-learning operations of the virtual instructions 834. For example, a first machine-learning operation of the virtual instructions 834 can be dependent upon a second machine-learning operation of the virtual instructions 834. That is, completion of the second machine-learning operation of the virtual instructions 834 is needed prior to processing of the first machine-learning operation of the virtual instructions 834 can commence. For example, a first machine-learning operation of the virtual instructions 834 can be dependent upon a second machine-learning operation of the native instructions 832. That is, completion of the second machine-learning operation of the native instructions 832 is needed prior to processing of the first machine-learning operation of the virtual instructions 834 can commence. The compiler computing module 802 can then, after identifying the dependencies between the machine-learning operations of the virtual instructions 834, encodes the dependencies within the virtual instructions 834. For example, the compiler computing module 802 can encode the dependencies within the virtual instructions 834 using identifiers (IDs) as references.

In some examples, the machine-learning operations of the native instructions 832 and the machine-learning operations of the virtual instructions 834 are synchronized based on the dependencies between the machine-learning operations of the native instructions 832 and the dependencies between the machine-learning operations of the virtual instructions 834, described further below.

In some implementations, the MLA 804 can receive the native instructions 832. The MLA 804 can perform machine-language operations according to the native instructions 832. For example, the MLA 804 can perform machine-language operations, including tensor operation data (e.g., activations, weights), based on the native instructions 832.

In some implementations, the interpreter computing module 820 can receive the virtual instructions 832. The interpreter computing module 820 can generate machine language instructions 840 based on the virtual instructions 832. The machine language instructions 840 are to be processed by the CPU 806 that implements the interpreter computing module 820. That is, the interpreter computing module 820 can generate the machine language instructions 840 from the virtual instructions 834 based on the CPU 806 (e.g., based on a type or implementation of the CPU 806). Moreover, the interpreter computing module 820 can cause the CPU 806 to perform the machine learning operations according to the machine language instructions 840. For example, the interpreter computing module 820 can cause the CPU 806 to perform an n-dimensional convolution machine learning operation according the machine language instructions 840.

In some examples, the native instructions 832 and the virtual instructions 834 are synchronized (e.g., parallelization of instruction decoding and operation execution). In short, at specific points of synchronization, each of the MLA 804 and the CPU 806 can issue synchronization tokens and/or wait on relevant synchronization tokens (e.g., bidirectional synchronization exchanges) prior to proceeding with processing of the instructions.

Specifically, the MLA 804 generates a synchronization token 850 indicating a processing completion of a particular machine-learning operation of the native instructions 832 on which at least one of the machine-learning operations of the virtual instructions 834 depends on. The MLA 804 can transmit the synchronization token 850 to the interpreter computing module 820, e.g., automatically in response to completion to the particular machine-learning operation of the native instructions 832, or within a time threshold of completion to the particular machine-learning operation of the native instructions 832. Moreover, the interpreter computing module 820 can receive the synchronization token 850. In response to receiving the synchronization token 850, the interpreter computing module 820 can execute at least one of the machine-learning operations of the virtual instructions 834. Specifically, the interpreter computing module 820 can determine that the synchronization token 850 received from the MLA 804 satisfies a dependency criteria associated with the particular machine-learning operation of the virtual instructions 834. The interpreter computing module 820, based on determining that the synchronization token 850 received from the MLA 804 satisfies a dependency criteria associated with the particular machine-learning operation of the virtual instructions 834, can execute the particular machine learning operation of the virtual instructions 834.

Furthermore, the interpreter computing module 820 generates a synchronization token 852 indicating a processing completion of a particular machine-learning operation of the virtual instructions 834 on which at least one of the machine-learning operations of the native instructions 832 depends on. The interpreter computing module 820 can transmit the synchronization token 852 to the MLA 804, e.g., automatically in response to completion to the particular machine-learning operation of the native instructions 832, or within a time threshold of completion to the particular machine-learning operation of the native instructions 832. Moreover, the MLA 804 can receive the synchronization token 852. In response to receiving the synchronization token 852, the MLA 804 can execute at least one of the machine-learning operations of the native instructions 832. Specifically, the MLA 804 can determine that the synchronization token 852 received from the interpreter computing module 820 satisfies a dependency criteria associated with the particular machine-learning operation of the native instructions 832. The MLA 804, based on determining that the synchronization token 852 received from the interpreter computing module 820 satisfies a dependency criteria associated with the particular machine-learning operation of the native instructions 832, can execute the particular machine learning operation of the native instructions 832.

Generating the two types of instructions—the native instructions 832 and the virtual instructions 834—by the compiler computing module 802 that are processed by the MLA 804 and the interpreter computing module 820/CPU 806, respectively, provides multiple benefits. Specifically, implementation of the compiler computing module 802 is simplified as the compiler computing module 802 generates separate native instructions 832 and virtual instructions 834 (as opposed to a single instruction set including both native and virtual instructions); and is further independent of the interpretation of the instruction set architecture of the CPU 806. Further, by generating separate virtual instructions 834 by the compiler computing module 802, new operands (operation code or opcodes) that are not currently supported by the MLA 804 can be supported by the interpreter computing module 820. This allows new operators to be defined within the system and used as new ML applications and use cases are employed.

In example use cases, the virtual instructions 834 can include such operations as i) transferring of data between the local memory 808 and the system memory 810, ii) transfer of data from the system memory 810 to the local memory 808, iii) fill-up with constants specific regions of the local memory 808 (e.g., tensor padding), and iv) perform specific non-native operations on tensors located in the local memory 808 (emulation of tensor processing functionality).

Figure 9:
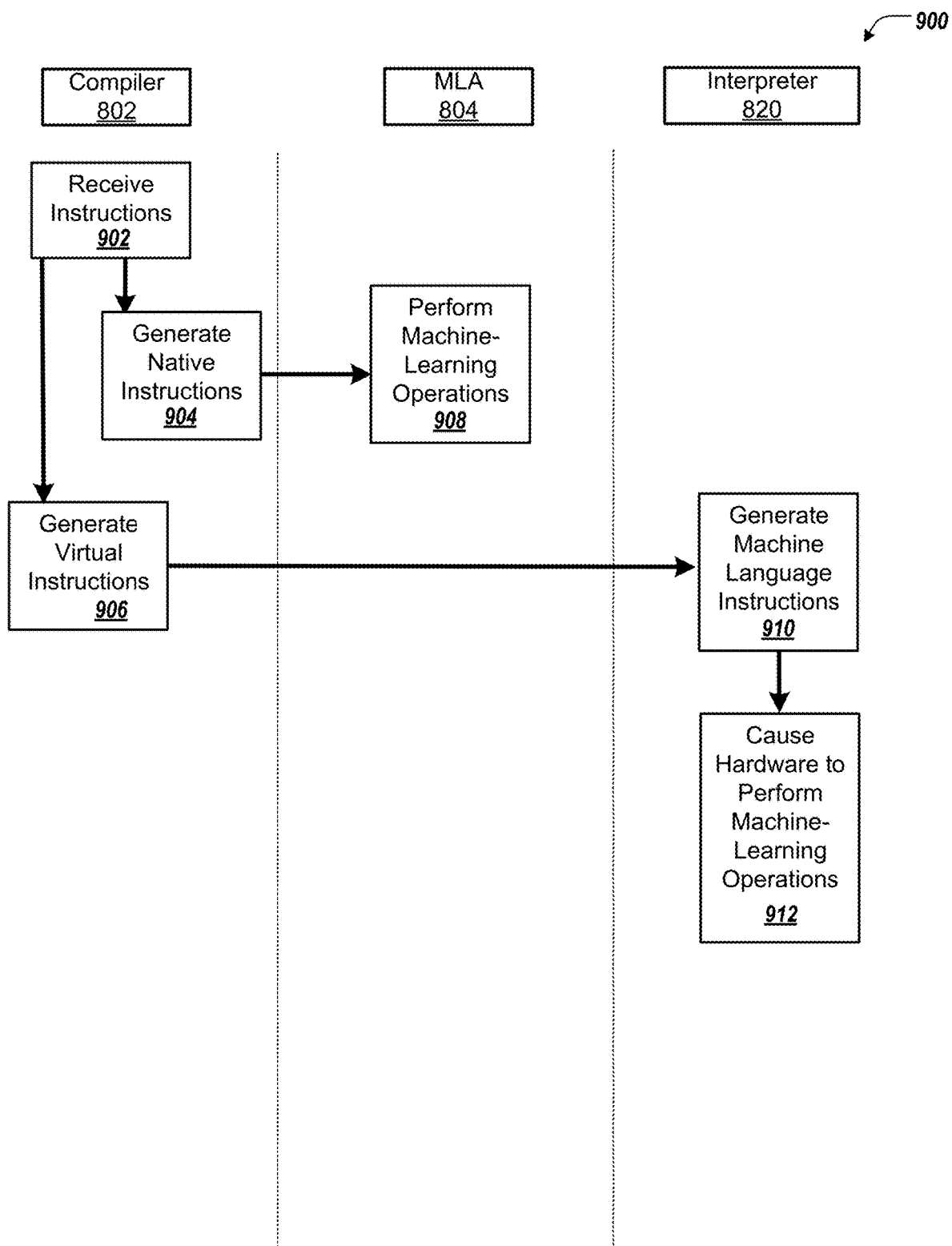
FIG. 9 illustrates an example method for generating native and virtual instructions streams.

FIG. 9 illustrates an example method 900 for generating native and virtual instructions streams, implemented by the computing environment 800, the compiler computing module 802, the MLA 804, the CPU 806, and/or the interpreter computing module 820 with respect to FIGS. 1-8.

The method 900 may begin at step 902, where the compiler 802 receives the instructions 830 to perform an inference using a machine-learning model (similar to that as described above). For example, the instructions 830 are associated with performing a n-dimensional convolution machine learning operation. At step 904, the compiler computing module 802, in response to receiving the instructions 830, can generate native instructions 832 that are configured to be processed by the MLA 804. At step 906, the compiler computing module 802, in response to receiving the instructions 830, can generate virtual instructions 834 that are configured to be processed by the interpreter computing module 820. At step 908, the MLA 804 can receive the native instructions 832, and perform machine-language operations according to the native instructions 832. For example, the MLA 804 can perform machine-language operations, including tensor operation data (e.g., activations, weights), based on the native instructions 832. At step 910, the interpreter computing module 820 can receive the virtual instructions 832, and generate machine language instructions 840 based on the virtual instructions 832. At 912, the interpreter computing module 820 can cause the CPU 806 to perform the machine learning operations according to the machine language instructions 840. For example, the interpreter computing module 820 can cause the CPU 806 to perform n-dimensional convolution machine learning operation according the machine language instructions 840.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for training a neural network machine learning model across different computing systems having different computer architectures/characteristics including the particular steps of the method of FIG. 9, this disclosure contemplates any suitable method for training a neural network machine learning model across different computing systems having different computer architectures/characteristics including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
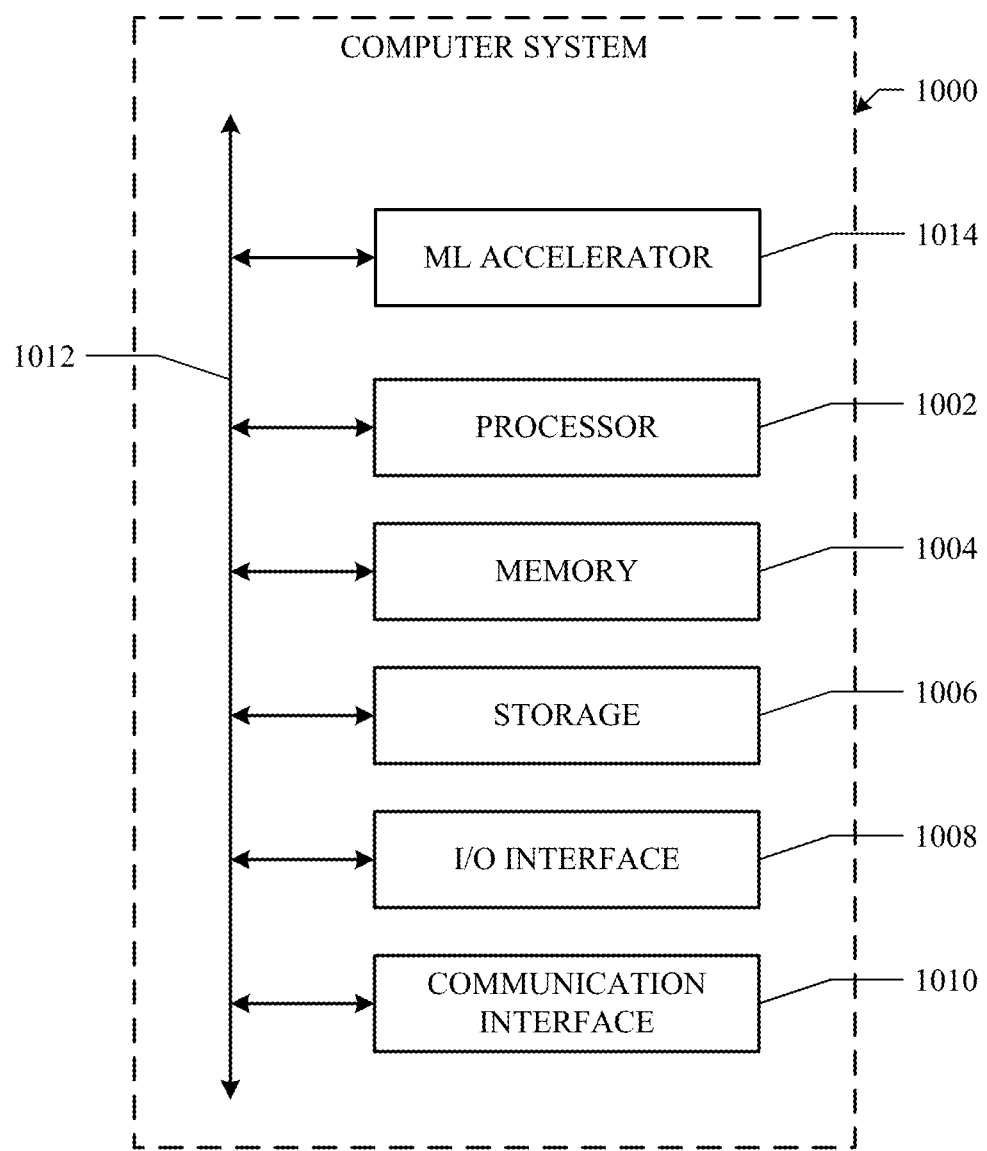
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM), a system-on-module (SOM), or a peripheral component interconnect express (PCIe) module, i.e., a data center accelerator card), a desktop computer system, a laptop or notebook computer system, an interactive kiosk, a mainframe, a mesh of computer systems, a mobile telephone, a personal digital assistant (PDA), a server, a tablet computer system, an AR/VR reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, a bus 1012, and an ML accelerator 1014, or multiple ML accelerators. In some examples, computer system 1000 can include any combination of multiple processors 1002, memories 1004, storages 1006, I/O interfaces, communication interfaces 1010, buses 1012, and/or ML accelerators 1014. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, ML accelerator 1014 may be similar to ML accelerator 620 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1014, as described herein. In particular embodiments, ML accelerator 1014 may be implemented using hardware and/or software elements in any suitable combination. As described herein, ML accelerator 1014 may include multiple tensor processor clusters and underlying tensor processors, each of which may include local memory for storing input features, weights for 2D kernels of various multi-dimensional filters, and/or output features of various convolution operations (not shown in FIG. 10). In particular embodiments, these local memories may be loaded from storage 1006, memory 1004, or from another source (such as, for example, another computer system 1000). The use of ML accelerator 1014 to execute the tensor instructions may improve the overall performance and resource utilization of computer system 1000 for those applications when compared to executing them using processor 1002 or using an existing ML accelerator.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system, comprising:
a machine learning accelerator (MLA) hardware configured to perform machine-learning operations according to native instructions;
an interpreter computing module configured to:
generate, based on virtual instructions, machine language instructions configured to be processed by a processing hardware implementing the interpreter computing module; and
cause the processing hardware to perform machine-learning operations according to the machine language instructions; and
a compiler computing module associated with the MLA hardware, the compiler computing module configured to:
receive instructions for performing an inference using a machine-learning model;
based on the received instructions:
generate the native instructions configured to be processed by the MLA hardware, the native instructions specifying first machine-learning operations associated with performing the inference; and
generate the virtual instructions configured to be processed by the interpreter computing module, the virtual instructions specifying second machine-learning operations associated with performing the inference.

2. The system of claim 1, further comprising a local memory of the MLA hardware, wherein the first machine-learning operations comprise computations using weights associated with the machine-learning model and activations, wherein the native instructions specify memory locations of the activations and the weights within the local memory of the MLA hardware.

3. The system of claim 2, wherein the second machine-learning operations comprise data transfers between the local memory of the MLA hardware and a system memory of the processing hardware.

4. The system of claim 1, wherein the compiler computing module is further configured to:
   identify first dependencies of the first machine-learning operations of the native instructions, and encode the first dependencies within the native instructions; and
   identify second dependencies of the second machine-learning operations of the virtual instructions, and encode the second dependencies within the virtual instructions;
   wherein the first machine-learning operations and the second machine-learning operations are synchronized based on the first dependencies and the second dependencies.

5. The system of claim 1, wherein the MLA hardware is further configured to:
   generate a synchronization token indicating a processing completion of one of the first machine-learning operations on which at least one of the second machine-learning operations depends; and
   transmit, to the interpreter computing module, the synchronization token.

6. The system of claim 5, wherein the interpreter computing module is configured to execute the at least one of the second machine-learning operations based on a determination that the synchronization token received from the MLA hardware satisfies one or more dependency criteria associated with the at least one of the second machine-learning operations.

7. The system of claim 1, wherein the interpreter computing module is further configured to:
   generate a synchronization token indicating a processing completion of one of the second machine-learning operations on which at least one of the first machine-learning operations depends; and
   transmit, to the MLA hardware, the synchronization token.

8. The system of claim 7, wherein the MLA hardware is configured to execute the at least one of the first machine-learning operations based on a determination that the synchronization token received from the interpreter computing module satisfies one or more dependency criteria associated with the at least one of the first machine-learning operations.

9. The system of claim 1, wherein the processing hardware is a central processing unit.

10. The system of claim 1, wherein the native instructions are generated according to a first instruction set architecture of the MLA, and the virtual instructions are generated according to a second instruction set architecture of the interpreter.

11. A method, comprising:
    receiving, by a compiler computing module, instructions for performing an inference using a machine-learning model;
    generate, by the compiler computing module and based on the received instructions, native instructions configured to be processed by MLA hardware, the native instructions specifying first machine-learning operations associated with performing the inference;
    generate, by the compiler computing module and based on the received instructions, virtual instructions configured to be processed by an interpreter computing module, the virtual instructions specifying second machine-learning operations associated with performing the inference;
    performing, by the MLA hardware, machine-learning operations according to native instructions;
    generating, by the interpreter computing module and based on the virtual instructions, machine language instructions configured to be processed by a processing hardware implementing the interpreter computing module; and
    causing, by the interpreter computing module, the processing hardware to perform machine-learning operations according to the machine language instructions.

12. The method of claim 11, wherein the first machine-learning operations comprise computations using weights associated with the machine-learning model and activations, wherein the native instructions specify memory locations of the activations and the weights within a local memory of the MLA hardware.

13. The method of claim 12, wherein the second machine-learning operations comprise data transfers between the local memory of the MLA hardware and a system memory of the processing hardware.

14. The method of claim 11, further comprising:
    identifying, by the compiler computing module, first dependencies of the first machine-learning operations of the native instructions, and encode the first dependencies within the native instructions; and
    identifying, by the compiler computing module, second dependencies of the second machine-learning operations of the virtual instructions, and encode the second dependencies within the virtual instructions;
    wherein the first machine-learning operations and the second machine-learning operations are synchronized based on the first dependencies and the second dependencies.

15. The method of claim 11, further comprising:
    generating, by the MLA hardware, a synchronization token indicating a processing completion of one of the first machine-learning operations on which at least one of the second machine-learning operations depends; and
    transmitting, by the MLA hardware and to the interpreter computing module, the synchronization token.

16. The method of claim 15, further comprising executing the at least one of the second machine-learning operations based on a determination that the synchronization token received from the MLA hardware satisfies one or more dependency criteria associated with the at least one of the second machine-learning operations.

17. The method of claim 11, further comprising:
    generating, by the interpreter computing module, a synchronization token indicating a processing completion of one of the second machine-learning operations on which at least one of the first machine-learning operations depends; and
    transmit, by the interpreter computing module and to the MLA hardware, the synchronization token.

18. The method of claim 17, further comprising executing the at least one of the first machine-learning operations based on a determination that the synchronization token received from the interpreter computing module satisfies one or more dependency criteria associated with the at least one of the first machine-learning operations.

19. One or more computer-readable non-transitory storage media embodying software that is operable when executed to:
   receiving, by a compiler computing module, instructions for performing an inference using a machine-learning model;
   generate, by the compiler computing module and based on the received instructions, native instructions configured to be processed by MLA hardware, the native instructions specifying first machine-learning operations associated with performing the inference;
   generate, by the compiler computing module and based on the received instructions, virtual instructions configured to be processed by an interpreter computing module, the virtual instructions specifying second machine-learning operations associated with performing the inference;
   performing, by the MLA hardware, machine-learning operations according to native instructions;
   generating, by the interpreter computing module and based on the virtual instructions, machine language instructions configured to be processed by a processing hardware implementing the interpreter computing module; and
   causing, by the interpreter computing module, the processing hardware to perform machine-learning operations according to the machine language instructions.

20. The computer-readable non-transitory storage media of claim 19, wherein the first machine-learning operations comprise computations using weights associated with the machine-learning model and activations, wherein the native instructions specify memory locations of the activations and the weights within a local memory of the MLA hardware.

* * * * *